Oct. 18, 1949.　　O. E. WAGENKNECHT　　2,485,223
PRESELECTED STOP MEANS FOR TUNER ELEMENTS
Filed Dec. 31, 1943　　8 Sheets-Sheet 1

OTTO E. WAGENKNECHT
*INVENTOR.*
BY
*HIS AGENT*

Oct. 18, 1949.  O. E. WAGENKNECHT  2,485,223
PRESELECTED STOP MEANS FOR TUNER ELEMENTS
Filed Dec. 31, 1943  8 Sheets-Sheet 2
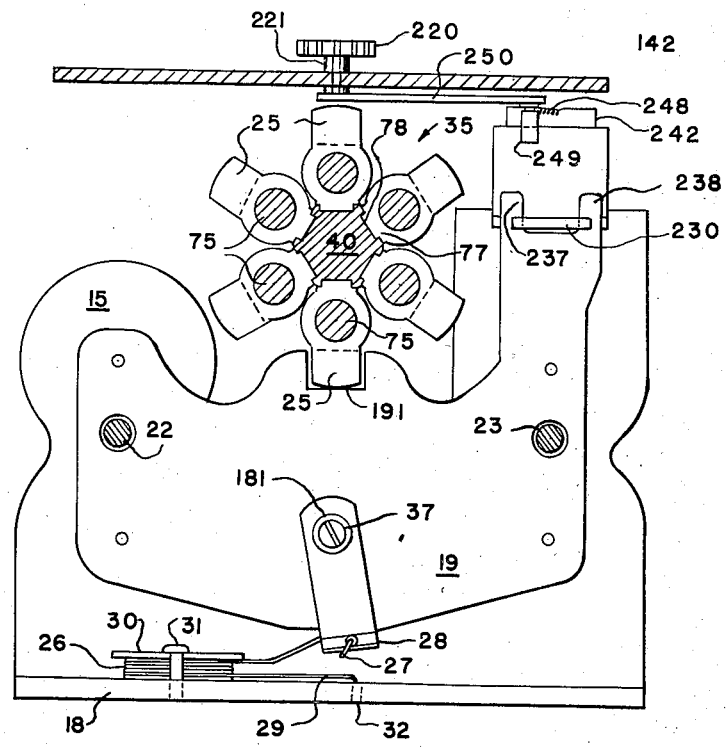
FIG. 2
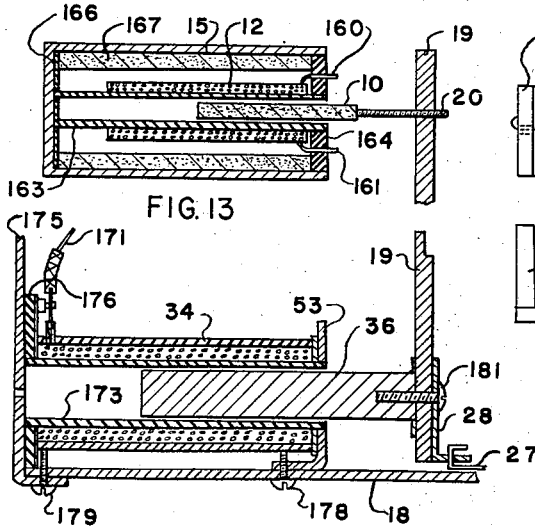
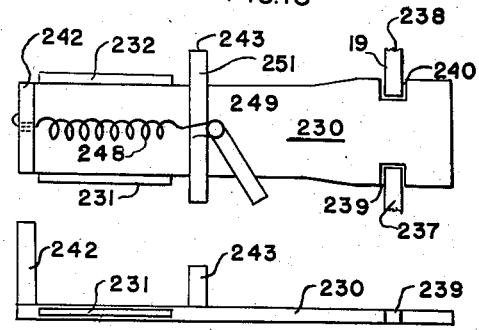
FIG. 19
OTTO E. WAGENKNECHT
INVENTOR
BY Bruce L Birchard
HIS AGENT

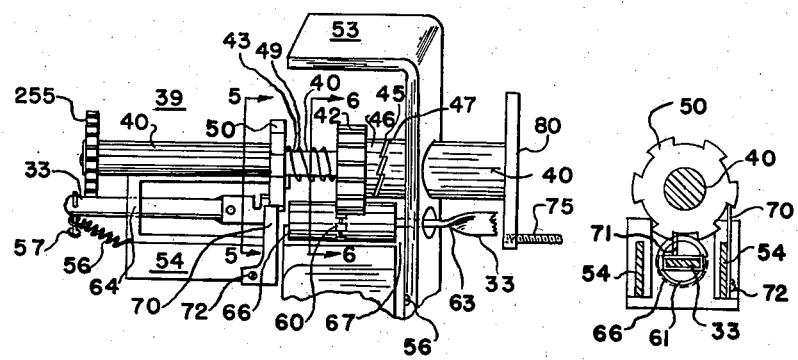
Fig. 3
Fig. 5
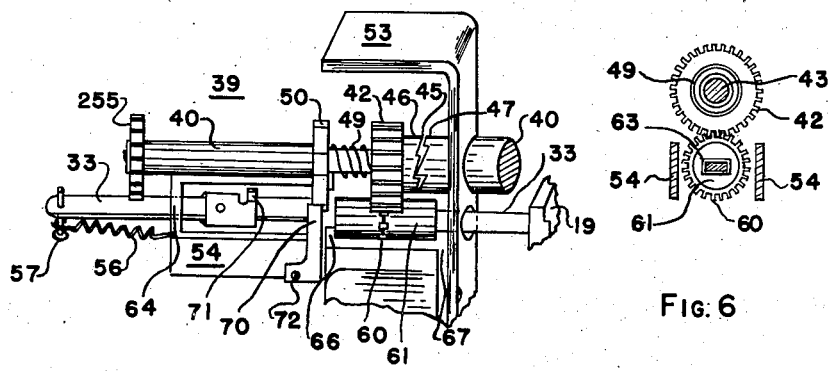
Fig. 4
Fig. 6
Otto E. Wagenknecht
INVENTOR
BY Bruce L. Birchard
HIS AGENT

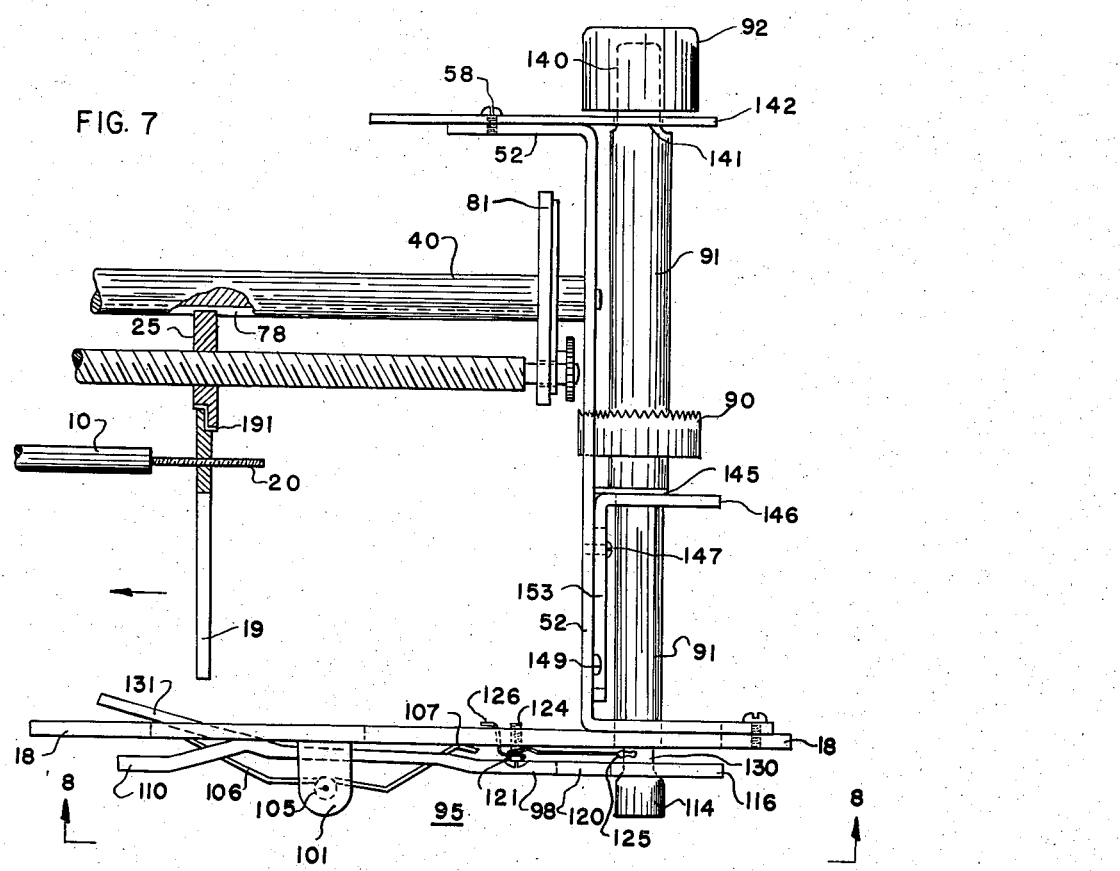
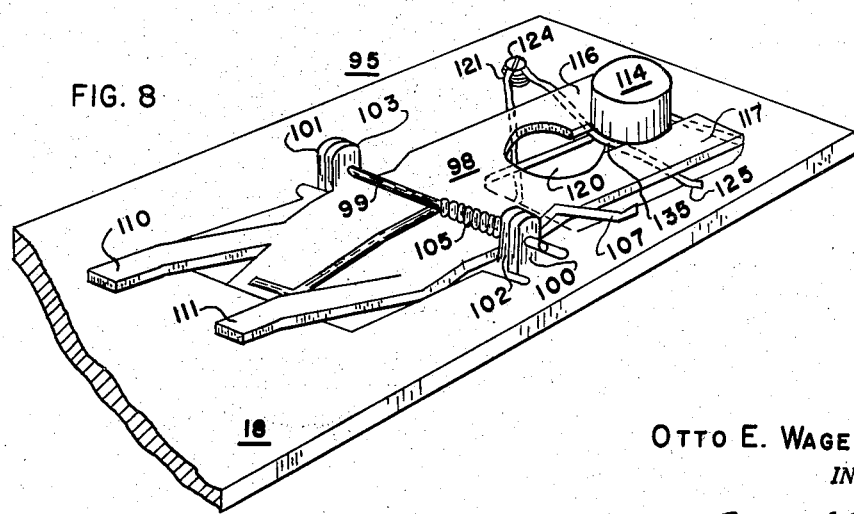

Oct. 18, 1949.  O. E. WAGENKNECHT  2,485,223
PRESELECTED STOP MEANS FOR TUNER ELEMENTS
Filed Dec. 31, 1943  8 Sheets-Sheet 5
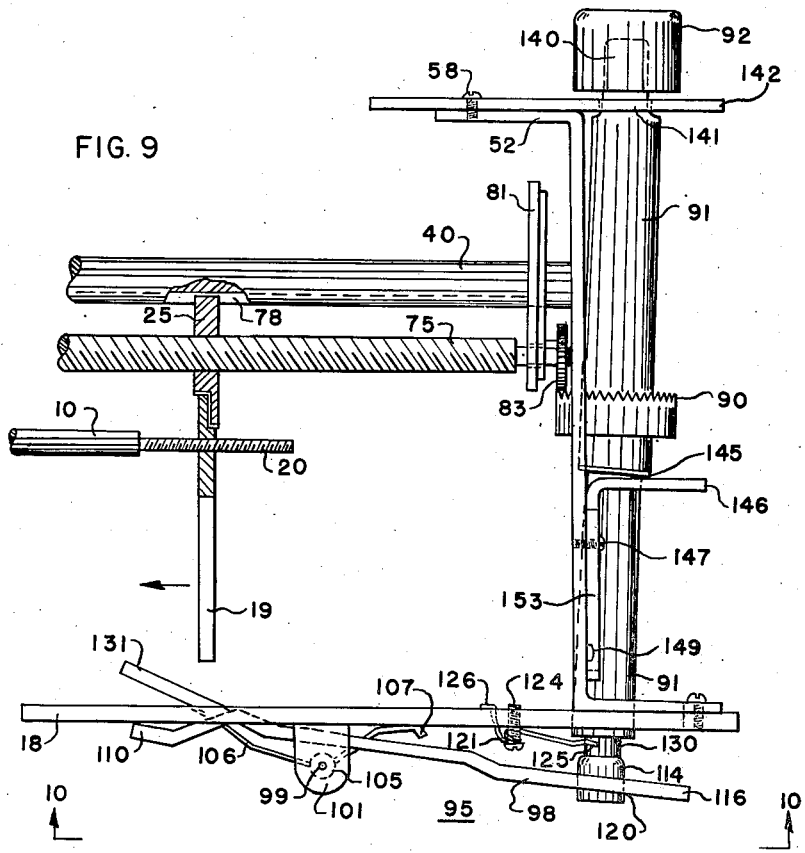
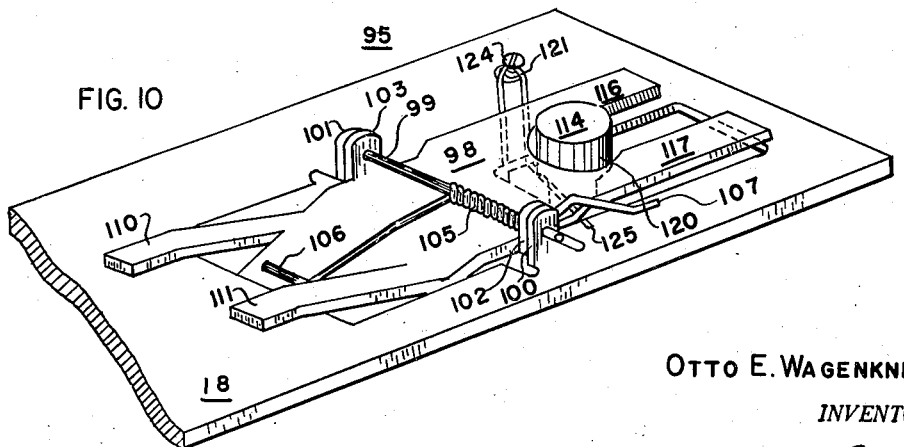
OTTO E. WAGENKNECHT
*INVENTOR.*
BY
*HIS AGENT*

Oct. 18, 1949.  O. E. WAGENKNECHT  2,485,223
PRESELECTED STOP MEANS FOR TUNER ELEMENTS
Filed Dec. 31, 1943  8 Sheets-Sheet 6

OTTO E. WAGENKNECHT
INVENTOR
BY Bruce L. Birchard
HIS AGENT

Oct. 18, 1949.   O. E. WAGENKNECHT   2,485,223
PRESELECTED STOP MEANS FOR TUNER ELEMENTS
Filed Dec. 31, 1943   8 Sheets-Sheet 7

OTTO E. WAGENKNECHT
INVENTOR.

BY *Bruce F. Birchard*

HIS AGENT

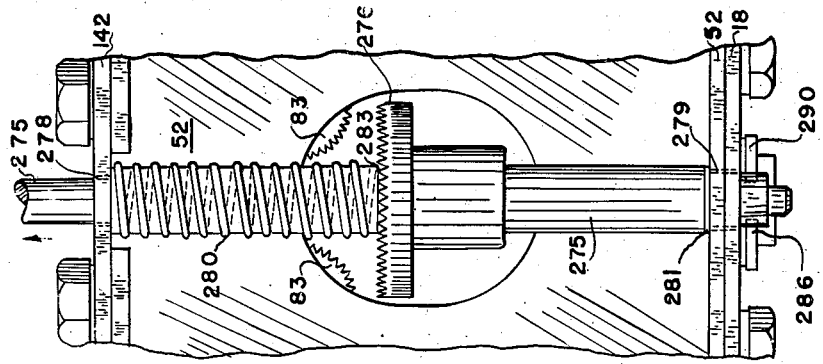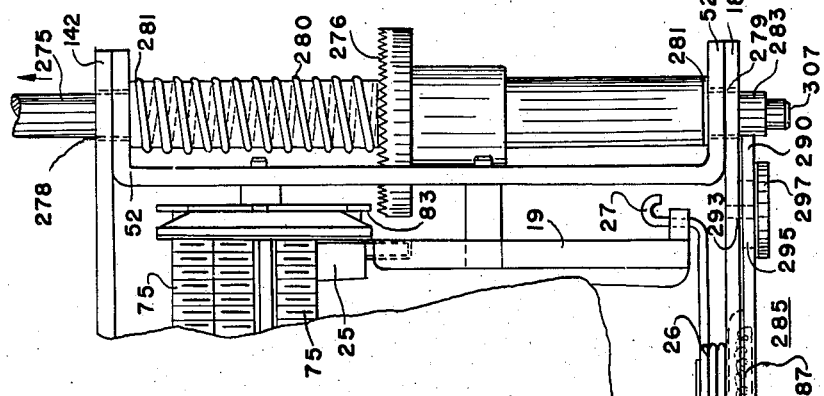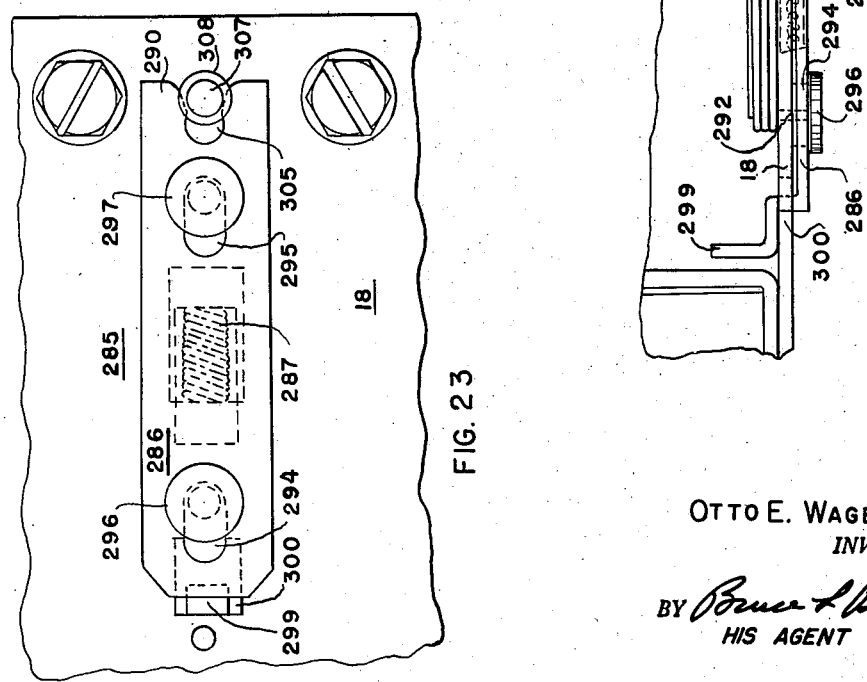

Patented Oct. 18, 1949

2,485,223

UNITED STATES PATENT OFFICE 2,485,223

PRESELECTED STOP MEANS FOR TUNER ELEMENTS

Otto E. Wagenknecht, Chicago, Ill., assignor to Zenith Radio Corporation, a corporation of Illinois Application December 31, 1943, Serial No. 516,362

8 Claims. (Cl. 192—143)

This invention relates to control devices and in particular to devices for tuning radio apparatus of the type that is effective to tune radio apparatus manually or automatically.

It is desirable in a radio receiving or transmitting system to have control apparatus of small size, of simple construction and of a minimum number of parts for changing the tuning of the system. The parts comprising the apparatus are preferably such that they are easily manufactured and assembled and easily adjusted to tune in a predetermined station, or easily varied to tune the system to any one particular frequency in a given frequency band. Mechanical tuning devices adapt themselves well to these requirements and they are relatively inexpensive to manufacture for they do not require all of the costly elements such as switches, coils and condensers used in most electrical tuning schemes wherein only a limited number of the tuning stages of the radio apparatus are tuned due to space requirements or expense.

In addition, it is desirable that the apparatus have a control member which is readily accessible to an operator either for adjusting the apparatus whereby it is effective either to tune in predetermined stations automatically when a second control member located at a remote point is actuated, or for varying the tuning of the system continuously through a given frequency band.

An object of this invention is to provide improved apparatus for tuning radio apparatus.

A further object of this invention is to provide novel control apparatus for general use in a wide variety of electrical equipment, including laboratory apparatus, power generation apparatus, and motive power equipment, as well as tunable apparatus such as radio transmitters and receivers.

Still another object of the present invention is to provide improved tuning apparatus especially adapted for use in compact radio equipment such as marine, aircraft and automobile radio equipment.

A still further object of the present invention is to provide improved means for enabling ready and convenient adjustment or variation of an electrical circuit controlling element.

A still further object of the present invention is to provide novel tuning apparatus of the mechanical type of small size in the manufacture of which accurate machine work to close tolerances is not required, and wherein loose fitting parts and play between the parts of either will not affect accuracy of tuning.

Yet another object of this invention is to provide improved apparatus including a convenient manual operating member for "setting up" the stations in a broadcast receiver without requiring the use of aligning instruments so that predetermined stations are automatically tuned in when pushbuttons or other similar apparatus is actuated; said manual operating member being arranged also to tune the receiver continuously through a given frequency band.

Still another object of this invention is to provide an improved radio tuning device for automatically or manually tuning radio apparatus without much effort on the part of an operator.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

Fig. 2 is a sectional view taken substantially on line 2—2 of Fig. 1;

Figs. 3 and 4 show certain elements of the apparatus shown in Fig. 1 in various operating positions;

Fig. 5 is a sectional view taken substantially on line 5—5 of Fig. 3;

Fig. 6 is a sectional view taken substantially on lines 6—6 of Fig. 3;

Figs. 7 to 10 show positions of certain elements of the apparatus shown in Fig. 1 in various operating positions;

Figure 1:
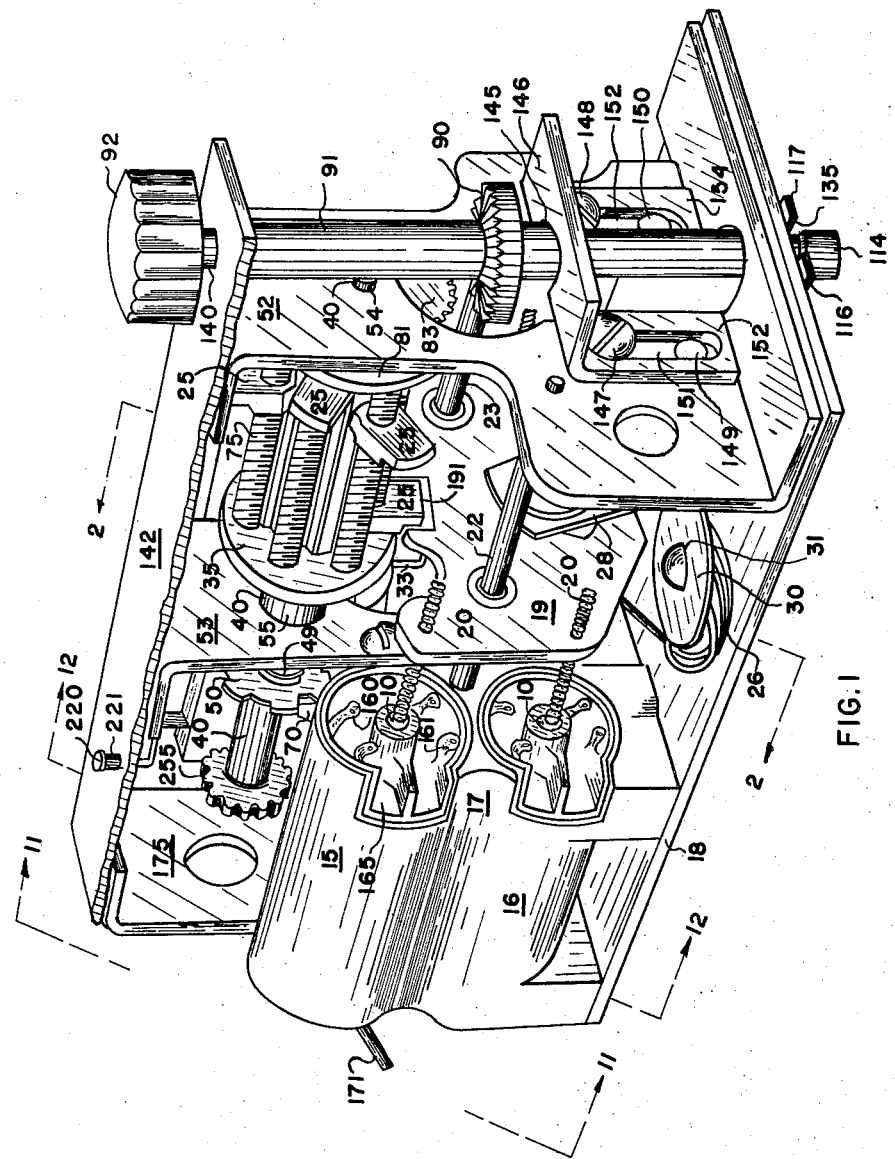
Figure 1 is a view of apparatus embodying the preferred form of the present invention.
Figure 11:
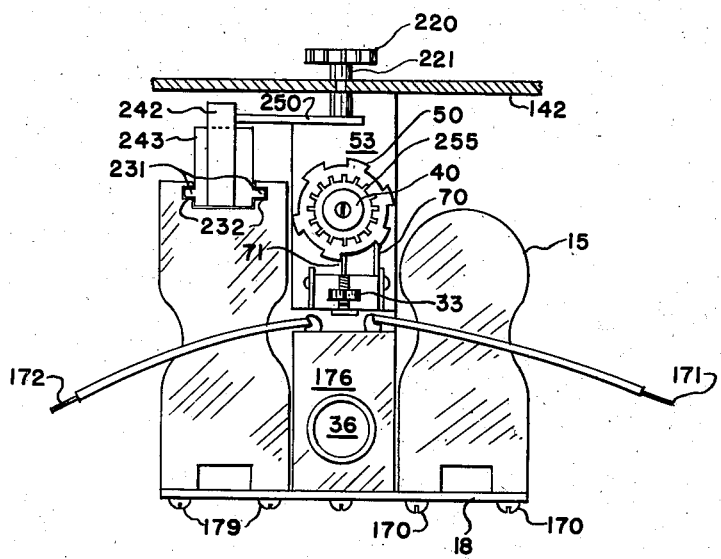
Figures 12, 15:
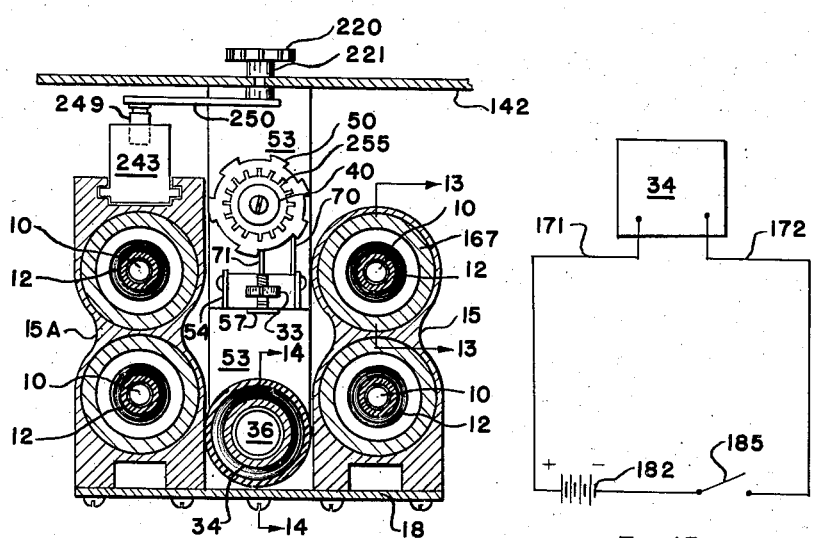
Figure 20:
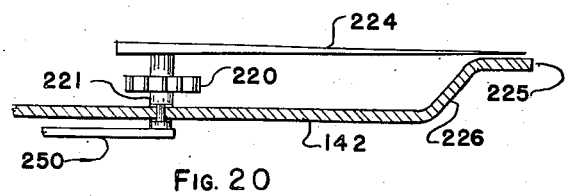
Figure 16:
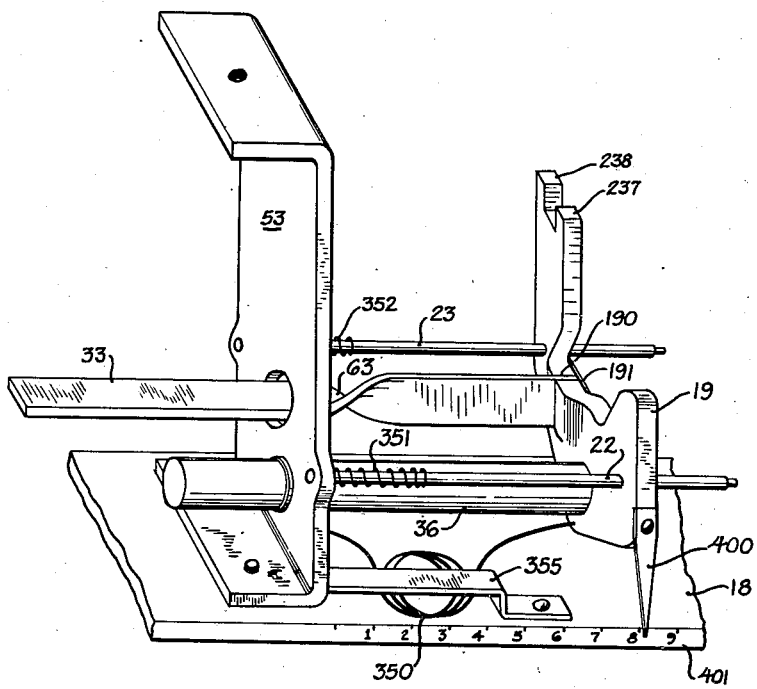
Figure 17:
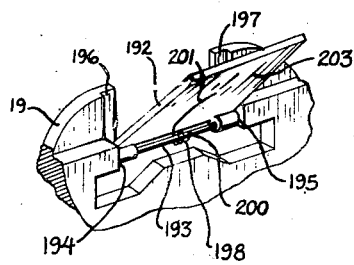

Figs. 11 and 12 show respectively an elevational and a sectional view taken substantially on lines 11—11 and 12—12 of Fig. 1;

Figs. 13 and 14 are sectional views taken substantially on corresponding lines in Fig. 12;

Fig. 15 shows a control circuit for apparatus embodying this invention;

Figs. 16 and 17 show modified arrangements of the apparatus shown in Fig. 1;

Figs. 18 and 19 show a portion of the indicating mechanism in apparatus embodying this invention;

Fig. 20 shows a modified indicating mechanism in apparatus embodying the present invention; and Figs. 21-24, inclusive, show modified apparatus embodying the present invention.

This invention has particular applicability to a tuning system of the type in which an electrical circuit controlling element may either be conveniently positioned to predetermined positions and later automatically actuated to such predetermined positions to tune an electrical circuit to predetermined frequencies from a remote point by means including a solenoid; or the circuit controlling element may be positioned continuously over a range of positions from a point near the receiver by manually operated means so that an electrical circuit is continuously tuned over a frequency band.

The tuning apparatus disclosed herein is broadly of the "turret tuner" type disclosed and claimed in United States Patent No. 2,310,720 of Clarence W. Wandrey, issued February 9, 1943.

Referring to the drawings wherein the same reference numerals in all of the figures designate similar parts, Fig. 1 shows apparatus for adjusting or varying the position of each one of the powdered iron cores or slugs 10 (Fig. 13) with respect to associated inductance coils 12 encased in and electrically insulated from metal cylinders 15 and 16, which cylinders are joined by a metallic web 17.

It is well known, of course, that the relative position of each cylindrical core member or slug 10 in its associated coaxial inductance coil 12 determines the inductance in henries of that particular coil. When, as in this application, one of the inductance coils 12 is connected in parallel circuit relationship with a condenser, the relative position of the core member 10 and associated coil 12 determines the resonant frequency of the circuit formed by the inductance coil 12 and the condenser. In this way, the position of the core member 10 with respect to its associated coil 12 determines the frequency to which a radio receiver or transmitter is tuned.

The apparatus disclosed herein is effective to position the core members 10 with respect to their associated coils such that those core members assume predetermined positions with respect to their associated coils 12 when the radio receiver or transmitter is automatically tuned by operating a pushbutton or similar device. Furthermore, the apparatus disclosed herein is effective to produce a continuous movement of the core members 10 with respect to their associated coils 12 when it is desired to tune the radio receiver or transmitter continuously through a given frequency band.

In this particular arrangement of my apparatus, the core members 10 are made movable and their associated coils 12 are relatively stationary, such coils being encased in and insulated from metal housings or shielding members 15 and 16, which housings are suitably fastened to base plate 18. It is understood, of course, that the coils 12 themselves may be made movable and the core members stationary, or the movable core members 10 shown herein may form one element of a cylindrical condenser. In its broadest aspect my invention has special applicability to any control arrangement wherein it is desired to position one element with respect to a second element.

In Fig. 1, the core members 10 are preferably adjustably mounted on carriage member 19 by means of a flexible coil springlike member 20 which has one end fastened in the core member 10 (Fig. 13) and is adjustably held in carriage 19 by the screw-threadlike portion of the spring member 20 engaging a cooperating screw-threaded portion in carriage 19. This particular manner of adjustably mounting the flexible members 20 and core 10 per se forms no part of this invention, but is disclosed and claimed in the United States Patent No. 2,423,275 of Clarence W. Wandrey issued July 1, 1947, and assigned to the assignee of this invention.

The movable carriage 19 carries core members 10 and its position determines the position of the core members 10 in their associated inductance coils 12, the carriage 19 being slidably mounted on guide members 22 and 23 (Figs. 1 and 2) which pass through cooperating guide apertures in the carriage 19. Carriage 19 is normally biased to the right in Fig. 1 against the most downwardly positioned one of the angular spaced stop members 25 by means of a prestressed spring 26 having one of its ends 27 (Fig. 2) fastened to the carriage extension 28, and its other end 29 fixed relative to the base plate 18 in base plate hole 32. Carriage 19 is provided with a recessed portion 191 arranged to snugly receive a stop member 25 for increasing the reset accuracy of carriage 19 in repeated operation of the tuning device.

Spring 26 is confined between the base plate 18 and a circular member 30, the spring 26 being wound and prestressed around the bolt 31 which has one end threaded in base plate 18, and which has circular member 30 attached on its other end by means, for example, of a pressed fit. The particular spring 26 is used advantageously because it occupies a very limited space and the force exerted thereby is relatively constant over the length of the travel of carriage 19 from abutting relationship with the turret actuating member 33 in Fig. 4 to abutting relationship with the most downward one of the stops 25 on turret 35 in Fig. 1.

Movement of carriage 19 to the left in Fig. 1 on guides 22 and 23 against the action of spring 26 to abutting relationship with turret actuating member 33 (Fig. 4) is accomplished by energizing solenoid 34 (Figs. 12 and 14) disposed with its longitudinal axis parallel to and spaced midway between the extension of the axes of guide members 22 and 23 (Fig. 2) such that when iron core 36 attached to carriage 19 by means of screw 37 (Fig. 2) is attracted by the magnetic force set up by the solenoid 34, carriage 19 moves to the left in Fig. 1 on guide members 22 and 23 without much friction but against the action of spring 26.

As long as solenoid 34 is energized, carriage 19 remains in its furthermost left position in Fig. 1, but when solenoid 34 is deenergized the carriage 19 moves to the right on guides 22 and 23 under the influence of restoring spring 26 until carriage movement to the right is arrested by one of the stop members 25 on turret 35.

In the furthermost right position of carriage 19 in Fig. 1, after it returns from engagement with turret actuating member 33, another stop member 25 is engaged which, of course, determines the rest position of carriage 19 and determines the position of core member 10 in its associated inductance coil 12. The means for causing another stop member 25 to arrest the travel of carriage 19 is described generally now and in more detail later.

In general, when carriage 19 moves to the left in Fig. 1 and approaches the end of its travel it engages the turret actuating member 33 and then moves it from its normal position shown in Fig. 3 to the position shown in Fig. 4 during which movement the turret actuating mechanism 39 is conditioned to rotate the turret shaft 40 and turret 35 an angular distance corresponding to the angular distance between adjacent stops 25. As turret carriage 19 moves from its furthermost left position near the position shown in Fig. 4, the turret shaft 40 and mechanically connected turret 35 is rotated an angular distance equal to the angular distance between stops 25 so that movement of carriage 19 is arrested by a stop adjacent to the one which previously arrested the movement of carriage 19.

In Fig. 1, the turret 35 carrying the adjustable stops 25 and having its shaft 40 extending substantially the full length of the composite device is journaled respectively in the vertically extending and supporting plates 52 and 53 respectively at points 54 and 55, the plates 52 and 53 being suitably secured to the base plate 18 by means of screw connections shown in Figs. 7 and 14. Turret shaft 40 is arranged to be rotated intermittently and only clockwise in Fig. 1 an angular distance corresponding to the angular distance between adjacent stops 25 each time carriage 19 moves to its furthermost left position in Figs. 1 and 4 and then returns substantially to its initial position.

Such intermittent movement of turret shaft 40 is caused by imparting alternate clockwise and counterclockwise movement to gear 42 in Fig. 6 which is rotatably and slidably mounted on turret shaft 40, the clockwise and counterclockwise movement being substantially an angular distance corresponding to the angular distance between adjacent stops 25. A pawl and ratchet engagement between gear 42 and shaft 40 is provided for causing turret shaft 40 to move only in accordance with the counterclockwise movement of gear 42 in Fig. 6. Pawl teeth 45 on extension 46 of gear 42 are pitched an angular distance corresponding to the angular distance between stops 25 and are normally pressed into engagement with cooperating ratchet teeth 47 on turret shaft 40 by compression spring 49 having one of its ends abutting the body portion of locking gear 50 fixed on turret shaft 40 and its other end abutting the rotatably and slidably mounted gear 42.

When gear 42 is moved clockwise in Fig. 6, relative movement is produced between gear 42 and turret shaft 40; pawl teeth 45 ride on ratchet teeth 47 and cause gear 42 to slide to the left in Fig. 4 on shaft 40 and such relative movement continues until the pawl portion of teeth 45 is pressed into an adjacent cooperating notch of ratchet gear 47 by compression spring 49. In such latter position gear 42 is positioned to rotate turret shaft 40 when gear 42 is moved counterclockwise, as seen in Fig. 6.

Suitable clockwise and counterclockwise movement of gear 42 for intermittently turning turret 35 is produced by linear back and forth movement of turret actuating member 33, such back movement being produced by engagement of carriage 19 with member 33 as shown in Fig. 4 and such forth movement being produced by the action of restoring spring 56 having one of its ends connected to an extension 57 of member 33 and its other end fixed relative to the base plate 18 on housing 54. Such back and forth movement of member 33 causes respectively counterclockwise and clockwise movement in Fig. 6 of gear 60 on cylinder 61 through which the member 33 passes, and since gear 60 constantly engages gear 42 the movement of gear 60 causes corresponding movement of gear 42.

For this purpose, turret actuating member 33 having a suitable carriage bearing face for engagement with carriage 19 and a twisted portion 63 (Figs. 3 and 6) arranged to pass through cylinder 61 and rotate gear 60 is supported for linear movement on support 54, the support 54 being suitably fastened to the supporting plate 53 by means of screws 56. The cylinder 61 is journaled in a suitably recessed portion of support 54 with the twisted portion 63 of actuating member 33 passing therethrough and a suitable guide aperture 64 in support 54 so that downward movement in Fig. 4 of member 33 and gear 60 is limited, upward movement of cylinder 61 in Fig. 4 being limited by the engagement of gear 60 with gear 42 and movement of cylinder 61 along its axial length being limited by flanges 66 and 67 on support 54.

Thus, linear movement of actuating member 33 is transformed into suitable rotary movement of gear 60 and connected gear 42 by providing actuating member 33 with a suitably twisted portion 63 along its axial length and by providing a suitable curved aperture in cylinder 61 through which twisted portion 63 passes in cooperating engagement.

Since the gear 42 slides as well as rotates on its supporting shaft 40, the axial length of gear 42 is made sufficiently large and its gear teeth are so shaped that gear 60 remains in constant engagement with gear 42 during a cycle of operation corresponding to a back and forth movement of actuating member 33.

In order that the turret 35 and its shaft 40 may not rotate when the apparatus is in the position shown in Figs. 1 and 3, the turret shaft 40 is blocked against clockwise and counterclockwise rotation respectively in Fig. 5 by flexible spring member 70 (Fig. 5) fastened to support 54 by screw 72 and projection 71 carried by turret actuating member 33, the end of spring member 70 and projection 71 engaging suitable portions of the locking wheel 50 fixed on turret shaft 40. It is noted that spring 70 is positioned so as to prevent at all times any substantial clockwise movement in Fig. 5 of turret shaft 40 and that substantial counterclockwise movement of the turret shaft 40 is permitted only when actuating member 33 is displaced by carriage 19 in which latter case projection 71 does not engage locking wheel 50.

With the apparatus thus far described it is evident that, each time actuating solenoid 34 is energized, the carriage 19 moves against the action of spring 26 from engagement with one stop member 25 to abutting and operating engagement with turret actuating member 33 so as to condition the turret actuating mechanism 39 for rotating the turret 35, and that when the actuating solenoid 34 is deenergized the carriage 19 moves under the influence of restoring spring 26, the turret 35 revolves an angular distance corresponding to the angular distance between adjacent stops 25 and further movement of the carriage is arrested by an adjacent stop 25.

Each stop member 25 adjustably mounted on individual screw-threaded shaft 75 in a direction substantially parallel to the axis of inductance coil 12 is displaced from adjacent stop members by equal angles of 60° in the particular device shown. Rotation of screw-threaded shaft 75 causes linear movement of the associated stop member carried thereon, the particular stop member 25 being guided and held from rotating by the cooperation of stop extension 77 (Fig. 2) in turret shaft grooves 78 extending the full length of adjustable stop travel.

Each screw-threaded stop positioning or bearing shaft 75 is journaled at its opposite ends in spaced flanges 80 and 81 (Fig. 1) fixed on turret shaft 40, the end of each such positioning shaft 75 carrying a gear 83 fixed thereto and arranged to be engaged by a gear of a manually operated actuating mechanism to be described now for adjusting or varying the position of a stop 25 on its associated screw-threaded shaft 75.

A gear 83 fixed on each rotatably mounted shaft 75 is arranged to be rotated by gear 90 on manually operated shaft 91 having a knob 92 mounted thereon so that a stop 25 threaded on shaft 75 moves along the axial direction of shaft 75 when knob 92 is rotated with gear 90 in cooperating engagement with gear 83 as shown in Fig. 1. Gear 90 is arranged to engage that one of gears 83 which is in the lowest position shown in Figs. 1 and 7 by moving the upper end of shaft 91 to the right in Figs. 1 and 7 about a pivot point substantially in the plane of top plate 142 and in a direction substantially perpendicular to the axis of shaft 91 so that shaft 91 assumes the position shown in Fig. 9.

When shaft 91 is moved from its position shown in Fig. 7 to the position shown in Fig. 9 by such movement of the upper projecting end of shaft 91 to the right in a direction substantially perpendicular to the axis of the shaft, gear 90 cooperates with gear 83 so that screw-threaded shaft 75 is rotated by rotating knob 92. Such rotation of screw-threaded shaft 75, having ends of reduced diameters journaled in members 80 and 81, causes longitudinal movement of that particular stop 25 on that particular shaft 75 which is rotated by rotation of gear 90.

Manual control member 91 having a convenient knob 92 mounted thereon is arranged to be positioned not only to rotate one of the gears 83 separately as shown in Fig. 9, but is also arranged to be automatically disengaged from such gears 83 as shown in Fig. 7. Control member 91 is mounted with a reduced portion 140 snugly engaging a cooperating aperture 141 in the head plate 142, the head plate 142 being securely mounted to support member 52 by screws 58, and with a face 145 on member 91 slidably mounted on the upper face of platform 146, which platform is normally held in adjustable position on supporting member 52 by means of screws 147 and 148. In the adjustment of the platform 146 for suitable movement of control member 91 to cause proper mesh between gears 83 and 90, the screws 147 and 148 are loosened and the platform 146 is guided by such screws and pins 149 and 150 in support 52 cooperating with apertured portions 151 and 152 of legs 153 and 154 of platform 146.

In order to hold manually operated shaft 91 in the position shown in Fig. 9, a latch mechanism 95 (Figs. 8 and 10) mounted on base plate 18 is provided. The function of such latch mechanism 95 is to hold the downwardly extending end of rotatably and pivotally mounted shaft 91 in its furthermost left position in Fig. 9 and to allow the manually operated shaft 91 to assume its normal position shown in Fig. 7 when carriage 19 is moved to the left in the direction of the arrow in Fig. 9, such carriage movement being produced by energizing solenoid winding 34 in a manner described previously.

Latch member 98 is pivotally mounted on base plate 18 by passing a shaft 99 respectively through suitably apertured and spaced ears 100 and 101 and suitably apertured and spaced ears 102 and 103 on base plate 18 and member 98, the shaft 99 being suitably held in base plate ears 100 and 101 by enlarging or bending the ends of shaft 99.

Latch member 98 is normally biased so as to tend to rotate clockwise in Figs. 7 and 9 due to a prestressed coil spring 105 wound around shaft 99 and having one of its ends 106 contacting member 98 and its other end 107 contacting base plate 18, such clockwise movement being limited by bifurcated integrally formed fingers 110 and 111 contacting base plate 18 when manual control member 91 is in the position shown in Fig. 9.

In the normal position of the control member 91 shown in Figs. 1 and 7, the member 98 is prevented from assuming its furthermost counterclockwise position in Fig. 7 by engagement of control member head 114 with each of the bifurcated integrally formed arms 116 and 117 of latch member 98. The bifurcated arms 116 and 117 are separated by an enlarged opening 120 through which control member head 114 passes when it is moved to its furthermost left position in Fig. 9 against the action of coil compression spring 121, the coil spring being prestressed by winding it around post 124 mounted on base plate 18 with one end 125 engaging control member shaft 91 and with its other end 126 engaging a suitable opening in base plate 18.

Control member 91 in Fig. 9 is maintained in the position shown because as shown in Fig. 10, its head 114 is positioned in the cooperating opening 120 of latch member 98 and latched in that position. Head 114 is unlatched by rotating latching member 98 counterclockwise in Fig. 9 about its supporting shaft 99 in which case the cylindrical walls of head 114 frictionally engage the cylindrical walls defining opening 120 until the member 98 rotates to a point where the smaller reduced diameter portion 130 of control member 91 enters opening 120 at which point control rod 91 is pushed to the right in Fig. 9 by spring 121.

Such counterclockwise movement of latching member 98 for unlatching control member head 114 results from movement of carriage 19 in the direction of the arrow shown in Fig. 9. For that purpose, integrally formed finger 131 on pivotally mounted latch member 98 normally extends up above the plate 18 and out of the path of motion of carriage 19 as shown in Fig. 7, but after control member 91 is moved to the right in Fig. 7 so as to assume the position shown in Fig. 9, the latch member 85 not only maintains the control member 91 in the position shown in Fig. 9 but also the latch member finger 131 extends up into the path of the carriage 19.

When carriage 19 moves to the left in Fig. 9 in the direction of the arrow, the finger 131 is cammed downwardly and the integrally formed bifurcated members 116 and 117 defining enlarged opening 120 are moved upward to a position where the reduced diameter portion 130 of control member shaft 91 is allowed to move to the right in the space 135 defined by the spaced bifurcated members 116 and 117 under the influence of spring 121.

Carriage 19 is moved to the left in Fig. 9 when solenoid winding 34 is energized and when so moved trips the latching mechanism 95 when and if such latching mechanism is effective to maintain gears 90 and 83 in cooperating engagement with one another.

The details of the variable inductance construction are shown in Fig. 13. Inductance coil 12 having terminals 160 and 161 is wound on insulating cylinder 163 having one of its ends permanently fastened in insulating closure member 164. Closure member 164 having a pair of apertures for the passage of leads 160 and 161 fits snugly in the metal shielding cylinder 15 with an offset portion 165 (Fig. 1) snugly engaging a cooperating cutout portion in cylinder 15 for preventing rotation of closure member 165 and its supported structure including coil 12 in the cylinder 15. The other end of insulating cylinder 163 is supported by an insulating washer 166 in cylinder 15. A magnetic flux path is provided for the flux set up in coil 12 by providing a powdered iron cylinder 167 coaxially disposed with respect to coil 12 and by providing the relatively movable powdered iron cylinder 10 which is positioned in coil 12 in a manner described above. The core member 10 is guided in its movement in the insulating coil support 163 and the other powdered iron member 167 snugly engages the inner cylindrical walls of shielding and supporting member 15 and is prevented from moving axially by engagement with washer 166 and closure member 164. Member 15 is fastened to base plate 18 by means of screws 170 (Fig. 11).

The details of the magnetic means for moving carriage 19 are shown in Fig. 14. The solenoid 34 having terminals 171 and 172 (Fig. 11) is wound on an insulating cylinder 173 which is supported on base plate 18 between supporting members 53 and 175. Cylinder 173 has one end fixed in a cooperating aperture in supporting member 53 and its other end fixed in a cooperating aperture in insulating member 176. Axial movement of cylinder 173 is prevented by supporting members 53 and 175 fastened to base plate 18 by means of fastening screws 178 and 179. Solenoid core member 36 attached to carriage 19 by means of screw 181 is drawn into solenoid winding 34 when current flows through winding 34 for actuating the carriage 19 in a manner described above. Movement of core 36 and carriage 19 to the left in Fig. 14 is accomplished by energizing winding 34, and movement of core member 36 and carriage 19 to the right in Fig. 14 after winding 34 is deenergized is accomplished by the prestressed spring having its end 27 fastened to carriage extension 28 which is held on carriage 19 by means of screw 181.

Fig. 15 shows a circuit arrangement for energizing solenoid winding 34 for moving core 36 and carriage 19 to the left in Fig. 14. In Fig. 15, one of the terminals 171 of solenoid winding 34 is connected to the positive terminal of a voltage source 182 and the other terminal 172 is connected to one terminal of switch 185 which may, for example, be a footswitch of the type shown in Patent No. 2,216,671 of McDonald, the remaining terminal of switch 185 being connected to the negative terminal of source 182 which may be the storage battery in an automobile.

Under very exceptional conditions, in the arrangement shown in Fig. 1, the carriage 19 may move to the right beyond a particular stop member 25 arranged to limit such movement of carriage 19 when the turret member 35 is rotated. This is so since, under certain exceptional conditions, the carriage 19 may move independently of the position of turret member 35. In order to prevent such abnormal movement of carriage 19, the twisted longitudinally movable actuating member 33 shown in Fig. 16 is permanently connected to carriage 19.

In Fig. 16, actuating member 33 having the twisted portion 63 arranged to rotate gear 60 (Fig. 6) is permanently fastened to the carriage 19 at point 190. The recessed portion 191 of carriage 19 is arranged to snugly receive the most downwardly extending one of the rectangularly shaped stop members 25 (Fig. 1) in its most right position in Fig. 1. With this arrangement in Fig. 16 in which the actuating member 33 is connected to carriage 19 and actuating member 33 is operatively connected to gear 60 as shown in Fig. 6, it is clear that the turret 35 and carriage 19 are always mechanically connected together and that these members are not allowed to move independently of one another but move jointly.

In the arrangement shown in Fig. 16, a restoring spring is not connected to member 33 as shown in the arrangement of Figs. 3 and 4, but the same purpose of restoring carriage 19 and member 33 to normal operating position is provided by prestressed coil spring 350 having one of its ends attached to carriage 19 and the other end attached to supporting member 53. Buffer coil springs 351 and 352 mounted respectively on guide members 22 and 23 and having one of their ends attached to supporting member 53 and the other one of their ends free for movement by carriage 19 provides an added force for returning the carriage 19 to the right in Fig. 16 after it is moved to the left in Fig. 16 by magnetic attraction of magnet core member 36. It is noted that buffer springs 351 and 352 are compressed only when the core member 36 is sufficiently far within its actuating solenoid 34 (Fig. 14) that relatively large forces are available for moving carriage 19. Conversely, the magnetic field set up in solenoid 34 (Fig. 14) when used in the arrangement shown in Fig. 16 need be of relatively small magnitude for effecting a cycle of operation. That is, buffer springs 351 and 352 and spring 350 may be considered to be a compound spring whose action allows a minimum amount of magnetic actuating force.

Also, in the arrangement shown in Fig. 16, it is noted that the position of the axis of coil spring 350 changes during a cycle of operation of the turret tuner. That is, coil spring 350 is free to move within a space bounded by the bent metal strap 355 which is rigidly mounted on base plate 18. With this particular arrangement of coil spring 350, the force exerted by spring 350 on carriage during a cycle of operation of the carriage 19 is relatively constant.

Fig. 17 shows an arrangement for allowing passage of a stop member 25 past the carriage 19 when, under exceptional conditions of operation of the arrangement shown in Fig. 1, the carriage 19 moves to the right in Fig. 1 beyond the point at which such stop member 25 normally arrests motion of the carriage. Such exceptional conditions arise when for one reason or other the carriage 19 is moved independently of the position of turret 35.

In Fig. 17, the carriage 19 has a spring biased stop engaging member 192 pivotally mounted on shaft 193 which has its opposite ends fixed in oppositely disposed faces 194 and 195 of carriage 19. Member 192 is normally biased against the projections 196 and 197 of carriage 19 by spring 200 having one of its ends fixed to the fixed shaft 193 and having its other end 201 abutting the normal stop engaging face 203. In normal operation, member 192 is spring biased against projections 196 and 197 and movement of carriage 19 is limited by contact of a stop member 25 against the face 203 of member 192. However, when, under abnormal conditions, the carriage 19 is moved past its particular arresting stop 25 under the influence of spring 26 (Fig. 1), and when subsequently solenoid 34 (Fig. 14) is energized, carriage 19 moves, member 192 is deflected downwardly due to contact between member 192 and a stop member 25, and such stop member 25 clears between the oppositely spaced faces 196 and 197 of carriage 19.

The position of core member 10 and connected carriage 19 is indicated by the angular position of gear wheel 220 (Figures 11 and 12) on shaft 221 which is operably connected to carriage 19. A gear train (not shown) may be connected to gear 220 for transmitting its angular position to a remote point by suitable and wellknown indicating mechanisms, or, in the modification shown in Fig. 20, the shaft 221 may be directly connected to an indicating pointer 224 arranged to cooperate with an indicating scale 225 on an extension 226 of top plate 142, top plate 142 being fastened by means of screws as shown in Fig. 1 to the supporting members 52, 53 and 175.

The mechanism for transferring linear movement of carriage 19 carrying core members 10 to rotary movement of shaft 221 carrying gear wheel 220 and an indicating pointer 224 (Fig. 20) is described now.

Carriage 19 is joined to a linearly movable and slidably mounted member 230 having a pair of tongue members 231 and 232 (Fig. 18) slidably engaging grooves 235 and 236 in the modified tuning coil holder and shielding structure 15A. In the assembly of the mechanism, the slidable member 230 is joined to carriage 19 by inserting the tongue members 231 and 232 in their cooperating grooves 235 and 236 in member 15A and then bending member 230 within its resilient limits such that oppositely disposed projections 237 and 238 on carriage 19 operatively engage recessed portions 239 and 240 of member 230 when member 230 is allowed to assume its nonbended or normal configuration as shown in Fig. 18.

Slidable member 230 carries a pair of projecting portions 242 and 243, projecting portion 242 serving as an abutment for anchoring tension spring 248 and projecting portion 243 serving as a contact face for cylindrical member 249 on arm 250, which member 249 moves on the surface 251 of member 243 but which positively engages member 243 due to the force exerted by tension spring 248 having one of its ends anchored on projection 242 and its other end fastened to cylindrical member 249 on arm 250.

Lever arm 250 connected at one of its ends to shaft 221 and connected to spring biased cylindrical member 249 at its other end transforms linear movement of projection 243 on member 230 to rotary movement of shaft 221 and gear 220 so that the angular position of shaft 221 and the position of parts connected thereto serve as an indication of the position of tuning members 10 and the tuned condition of a radio receiver in which the coils 12 and core members 10 form a part.

Figs. 21–24, inclusive, show a modified manual control means arranged to position stops 25 on their threaded shafts 75. This modification is characterized by the fact that the manual control rod instead of moving pivotally, as in the prior arrangement, moves in a direction perpendicular to its axis.

In Figs. 21–24, inclusive, rod 275 having actuating gear 276 integrally formed thereon and movable in a direction parallel to its axis in cylindrical guide openings 278 and 279, respectively, in the top plate 142 base plate 18 and supporting member 52 is normally biased downward in Fig. 21 by prestressed compression spring 280 with shoulder 281 of rod 275 in engagement with the curved extension of supporting plate 52, the spring 280 having one of its ends abutting top plate 278 and its other end abutting the shoulder 283 having gear 276 thereon.

When manual control rod 275 is moved upward in the direction of the arrow in Fig. 21, gear 276 engages the most downward one of the gears 83 on its associated rod 75 so that a stop member 25 carried on such rod is moved along the rod 75 by rotating manual control rod 275 with gear 276 in engagement with gear 83. Rod 275 is maintained in its engaging position with gear 83 by a latch mechanism 285 described now.

The latch mechanism 285 for holding gear 276 in engagement with gear 83 comprises a latch bar 286 slidably mounted and guided on base plate 18 with a spring 287 for biasing the end 290 of bar 286 into engagement with the projecting end of manual control rod 275, the compression spring 287 having one of its ends abutting a recessed portion of base plate 18 and its other end abutting the recessed portion in bar 286 so as to tend to push bar 286 to the right in Fig. 21.

The bar 286 is slidably mounted and guided on base plate 18 by pins 292 and 293 respectively passing through latch bar apertures 294 and 295 and having one of their ends anchored in base plate 18, the other ends of pins 292 and 293 carrying enlarged heads 296 and 297 for holding latch bar 286 on base plate 18. A projecting portion 299 of latch bar 286 extends upward through an aperture 300 in base plate 18 in the path of carriage 19 for moving latch bar 286 to the left in Fig. 21 each time solenoid 34 (Figs. 12 and 15) is energized whereby end 290 of latch bar 286 disengages the manual control rod 275.

Manual control rod 275 is latched into operative position with one of the gears 83 (Fig. 21) by moving it upward in a direction parallel to its axis in which case the spring pressed latch bar 286 having opening 305 of slightly larger diameter than the diameter of control rod portion 307 engages such portion and enlarged portion 308 as shown in Fig. 24 so as to hold the manual control rod 275 in its most upward position in Fig. 21 in engagement with gear 83 and against the action of compression spring 280. Then, when carriage 19 is moved to its furthermost left position in Fig. 21 by energizing solenoid winding 34 (Figs. 12 and 15), carriage 19 abuts latch bar projection 299 and moves the latch bar end 290 out of engagement with the reduced portion 307 whereupon the manual control rod 275 moves downward in Fig. 24 due to the action of compression spring 280. When and as carriage 19 moves from its furthermost left position in Fig. 21, latch bar end 290 engages the enlarged portion 308 of manual control rod 275 and movement of latch bar 286 is thereby limited, such movement of latch bar end 290 being due to the action of compression spring 287.

Referring again to Fig. 16, the carriage 19 arranged to carry the movable tuning elements of a radio receiver carries a pointer 400 permanently fastened together for cooperation with a suitable scale 401 on base plate 18 so that an observer may observe the tuned condition of the receiver.

Of course, the scale 401 may be placed on some other suitable portion of the turret tuner and pointer 400 may be bent to coact with such scale.

While the particular embodiments of the present invention have been shown and described, it will be obvious to those skilled in the art that changes and modifications may be made without departing from the invention in its broader aspects, and therefore the aim in the appended claims is to cover all such changes and modifications as fall within the true spirit and scope of this invention.

I claim:

1. A tuner for a radio receiver comprising a movable tuning member, a carriage for the tuning member, an adjustable stop for said carriage, a spring biased stop contact member pivotally mounted on the carriage, means tending to move the carriage in one direction, means to retract the carriage in the opposite direction, and means operatively connected to said first named means for positioning said stop member in the path of movement of said tuning member when said retracting means moves said tuning member.

2. A tuner for a radio receiver comprising a longitudinally movable tuning member and a series of stops, a carriage for the tuning member, a spring biased stop contact member pivotally mounted on the carriage, and electrically operated means for rendering said stops effective in succession to arrest repeated movement of said movable tuning member upon movement thereof in one direction.

3. In combination in a radio tuner, movable tuning mechanism, a plurality of stops arranged to be sequentially positioned in the path of travel of said movable tuning mechanism, a manual control, means responsive to movement of said manual control for operatively connecting said control to any one of said stops in engagement with said tuning mechanism, means responsive to additional movement of said control for adjusting such engaged stop thereby to adjust said movable tuning mechanism, and separate means for releasing said tuning mechanism from an engaged stop, for moving an adjacent stop into said path of travel, for moving said tuning mechanism into engagement with said adjacent stop and for disconnecting said control from such previously engaged stop and from said adjacent stop, said disconnecting means being arranged to cause such disconnection between any one of said plurality of stops and said control as said stops sequentially engage said mechanism.

4. In combination in a radio tuner, movable tuning mechanism, a plurality of stops arranged to be sequentially positioned in the path of travel of said movable tuning mechanism, stop moving means associated with each of said stops, a manual control, means responsive to sidewise movement of said manual control for operatively connecting said control to any one of said stops in engagement with said tuning mechanism and for adjusting such engaged stop and movable tuning mechanism in response to rotation of said control, and separate means for releasing said tuning mechanism from a stop, for moving an adjacent stop into said path of travel, for moving said tuning mechanism into engagement with said adjacent stop and for disconnecting said control from such previously engaged stop and from said adjacent stop, said disconnecting means being arranged to cause such disconnection between any one of said plurality of stops and said control as said stops sequentially engage said mechanism.

5. In combination in a radio tuner, a movable tuning member, a plurality of stops arranged to be sequentially positioned in the path of travel of said movable tuning member, said member and stops being arranged to be moved into contact in only one direction, means for releasing engagement between said stops and member in response to movement therebetween in the opposite direction, a manual control, means responsive to movement of said manual control for operatively connecting said control to any one of said stops in engagement with said tuning member, means responsive to additional movement of said control for adjusting such engaged stop thereby to adjust said movable tuning member, and separate means for moving said member in said opposite direction away from a stop; for moving an adjacent stop into said path of travel, for moving said tuning member in said one direction into engagement with said adjacent stop and for disconnecting said control from such previously engaged stop and from said adjacent stop; said disconnecting means being arranged to cause such disconnection between any one of said plurality of stops and said control as said stops sequentially engage said tuning member.

6. In combination in a radio tuner, a longitudinally movable tuning member, a plurality of stops sequentially rotatable into the path of travel of said tuning member, a gear having a hollow portion, a helical member movable longitudinally and arranged to pass through the hollow portion of said gear to turn said gear in response to longitudinal motion of said helical member, means for moving said helical member longitudinally in response to at least a portion of the movement of said tuning member thereby to turn said gear, a second gear engaging said first gear to turn therewith, a pawl and ratchet arranged with said second gear and said stops to rotate said stops in response to longitudinal motion of said helical member an amount sufficient to place an adjacent stop in the path of travel of said tuning member, a manual control, means responsive to movement of said manual control for operatively connecting said control to any one of said stops in engagement with said tuning member, means responsive to additional movement of said control for adjusting such engaged stop thereby to adjust said tuning member, and separate means for moving said tuning member from a stop and back to an adjacent stop and for simultaneously disconnecting said control from such previously engaged stop and from said adjacent stop, said disconnecting means being arranged to cause such disconnection between any one of said stops and said control as said stops sequentially engage said tuning member.

7. In combination in a radio tuner, a movable tuning member, a plurality of stops arranged to be sequentially moved into the path of travel of said member, means for moving said member in one direction away from one of said stops with which said member is engaged, spring means for moving said member back into engagement with one of said stops, and means responsive to such back movement of said member toward said stops for moving previously engaged stop out of the path of travel of said member and for moving said adjacent stop out of the path of travel, said stop moving means being arranged to move said stops during the initial portion of such back movement of said member toward said stops whereby said stop moving means imposes substantial load on said spring means during such initial back movement, said spring means comprising a relatively weak spring portion of sufficient strength to move said member in the absence of said stop moving means and a relatively strong spring portion arranged to supply sufficient additional force to said member during such initial back movement to operate said stop moving means.

8. In combination in a radio tuner, a longitudinally movable tuning member, a plurality of stops sequentially movable into the path of travel of said tuning member, a rotatable member having a hollow portion, a helical member connected with said longitudinally movable tuning member for longitudinal movement therewith and arranged to pass through the hollow portion of said rotatable member to turn said rotatable member in response to longitudinal motion of said tuning member and said helical member, and means for moving said tuning member away from an engaged one of said stops and for moving an adjacent stop into said path of travel in response to rotation of said rotatable member and for moving said tuning member back into engagement with said adjacent stop, whereby connection between said helical member and said tuning member provides movement of said stops only upon disengagement of said tuning member and said stops.

OTTO E. WAGENKNECHT.

REFERENCES CITED

The following references are of record in the file of this patent:

UNITED STATES PATENTS

| Number | Name | Date |
|---|---|---|
| 1,020,968 | De Wald et al. | Mar. 26, 1912 |
| 1,518,473 | Whaler | Dec. 9, 1924 |
| 1,561,487 | Ryder | Nov. 17, 1925 |
| 1,592,121 | Moore | July 13, 1926 |
| 1,598,146 | McKenzie | Aug. 31, 1926 |
| 1,974,207 | Ellinger | Sept. 18, 1934 |
| 2,214,506 | Manning | Sept. 10, 1940 |
| 2,217,066 | Manning | Oct. 8, 1940 |
| 2,256,668 | Dunn et al. | Sept. 23, 1941 |
| 2,260,599 | Benton et al. | Oct. 28, 1941 |
| 2,283,925 | Harvey | May 26, 1942 |
| 2,310,720 | Wandrey | Feb. 9, 1943 |
| 2,342,851 | Fichter et al. | Feb. 29, 1944 |